United States Patent [19]

Bodner et al.

[11] Patent Number: 5,459,725
[45] Date of Patent: Oct. 17, 1995

[54] RELIABLE MULTICASTING OVER SPANNING TREES IN PACKET COMMUNICATIONS NETWORKS

[75] Inventors: Rachel A. Bodner, Raleigh, N.C.; Chee-Seng Chow, Briarcliff Manor; Israel Cidon, New York, both of N.Y.; John G. Dudley, Raleigh, N.C.; Allan K. Edwards, Raleigh, N.C.; Inder S. Gopal, New York, N.Y.; Chandra P. Immanuel, Durham, N.C.; Marc A. Kaplan, Katonah, N.Y.; Shay Kutten, Rockaway, N.J.; Theodore E. Tedijanto, Cary, N.C.

[73] Assignee: International Business Machines Corporation, Armonk, N.Y.

[21] Appl. No.: 215,534

[22] Filed: Mar. 22, 1994

[51] Int. Cl.⁶ .................................................... H04L 1/12
[52] U.S. Cl. ............................................ 370/60; 370/94.3
[58] Field of Search ........................... 370/94.3, 94.1, 370/60, 60.1, 61, 85.13, 85.14

[56] References Cited

U.S. PATENT DOCUMENTS

| | | | |
|---|---|---|---|
| 5,079,767 | 1/1992 | Perlman | 370/94.3 |
| 5,265,092 | 11/1993 | Soloway et al. | 370/94.3 |
| 5,289,460 | 2/1994 | Drake, Jr. et al. | 370/94.3 |
| 5,331,637 | 7/1994 | Francis et al. | 370/94.3 |
| 5,355,371 | 10/1994 | Auerbach et al. | 370/94.3 |

OTHER PUBLICATIONS

A. Gopal, I Gopal, S. Kutten, "Broadcast in Fast Networks," INFOCOMM Conference 1990, pp. 1–9, Jun., 1990.
E. J. Weldon, Jr., "An Improved Selective–Repeat ARQ Strategy," *IEEE Transactions on Communications*, vol. COM–30, No. 3, pp. 480–486, Mar. 1982.

*Primary Examiner*—Douglas W. Olms
*Assistant Examiner*—Min Jung
*Attorney, Agent, or Firm*—Robert O. Nimtz; Gerald R. Woods

[57] ABSTRACT

A packet communications network in which multicast transmissions are made reliable by transmitting acknowledgements to all neighbors of every receiving node, including the source node. This allows the relinquishment of message holding buffers as soon as all near neighbors acknowledge receipt of the message after only tile longest round trip time to the nearest neighbors, rather than the round trip to the furthest destination. Moreover, highly reliable ancillary point-to-point transmission facilities can be used to retransmit multicast messages indicated as being lost by failure of acknowledgment. Finally, network partitions occurring during the multicast procedure do not necessarily lose the multicast message to the remote partitions since any node receiving the message can insure delivery to all other nodes in that partition.

31 Claims, 5 Drawing Sheets

RELIABLE MULTICASTING OVER SPANNING TREES IN PACKET COMMUNICATIONS NETWORKS

TECHNICAL FIELD

This invention relates to packet transmission systems and, more particularly, to reliable multicast tree communications in such systems.

BACKGROUND OF THE INVENTION

Packet transmission networks have become common for providing communications between data processing centers as well as other communications users. Packet transmission systems comprise a plurality of packet switching nodes interconnected with transmission links. Such transmission systems divide digital information into a plurality of packets having a header with all of the routing information necessary to control the switching nodes in order to move the packet from the originating node to the destination node. Packet networks were originally created on a local level for servicing closely clustered data processing sites. Increasingly, however, packet networks are being used for large, widely distributed data processing sites which may be not only national, but international in scope.

Several different routing protocols have been used to control the routing of packets from node to node through a packet transmission system. Such protocols include the so-called "swap" protocol in which the label in the packet header is used as a look-up address in a table to determine the next leg of the route. Automatic Network Routing (ANR) uses a concatenation of link labels to identify the successive legs of the route, which labels are stripped away one at a time as the packet traverses the network, always leaving the next-to-be-used label at the head of the routing field. Another such routing protocol, called "tree multicast routing," is the subject matter of the present invention. In this routing protocol, a tree is defined as a connected set of network nodes and links having no cycles or loops. The term "multicast" means that a single sender transmits the same packets to a multiplicity of receiving nodes. Such a multicast tree utilizes a tree address in the routing field of the packet header. The same tree address is associated with each transmission link forming part of the multicast tree. When a multicast packet reaches a packet switching node, the tree address in the packet header is compared to the tree addresses associated with all of the outgoing transmission links from that node. If a match occurs, the packet is forwarded on the transmission links for which the match occurs, except for the link on which the packet is received. It will be noted that multiple copies of the packet may be generated at each switching node to accommodate multicast trees having multiple branches at the switching node.

Multicast tree routing has become a common method of communicating over a packet transmission system due to the efficiencies of the multicast tree protocol. It will be noted that such multicast tree routing can be used for the distribution of packets to all nodes of a communication network and involves the determination and maintenance of the optimum path (the spanning tree) for connecting the nodes with each other. It has been common in the prior art to create and use multicast spanning trees for this purpose. Considerable problems arise, however, if nodes are added or removed from the network or if hardware failures and reactivation cause partition of the tree or the creation of cycles in the spanning tree. The reliable distribution of multicast messages in a constantly changing tree structure is the subject matter of the present invention.

Prior art methods for reliable distribution of multicast messages across a spanning tree involved the sending node storing the message until acknowledgments are received from each receiving station on the spanning tree, and retransmitting the message to those receiving stations not acknowledging reception. However, because the network is not static and nodes may join or leave the network, the sender does not always know how many nodes are in the tree nor how many acknowledgments are to be expected for each message sent. Moreover, if the network becomes partitioned due to the failure of a node or a link, it is impossible to ensure consistency of information transfer to all nodes in the network or even to all nodes within a given partition of the network. This is particularly important when a multicast spanning tree is used to route network topology information to all nodes of a network, and consistent views of the network topology are required for accurate routing of data packets.

SUMMARY OF THE INVENTION

In accordance with the illustrative embodiment of the present invention, the topological information at each node in a spanning tree is used to insure reliable transmission to all nodes of the spanning tree. This information includes the number of immediate neighbors for each node in the spanning tree, the identity of each neighbor and the path identification necessary for transmitting messages to each such neighbor. Reliable distribution of multicast messages utilizes both forward and backward acknowledgments across each link in the spanning tree. That is, the source node transmits to each neighbor, each other node except the source node forwards the multicast message to all neighboring nodes, on the spanning tree except the one from which it was received, and each node, including the source node, also sends an acknowledgment of the receipt of the message to each of its neighbors. Each of these nodes continues to store the message until it receives an acknowledgment from each of its neighbors. If a node does not receive an acknowledgment from each of its neighbors, the message is retransmitted to each of the neighbors failing to acknowledge the original transmission, using a so-called "reliable point-to-point connection" between adjacent nodes. The message is discarded once an acknowledgment is received for the message from each immediate neighbor, or when the message is retransmitted using the reliable transmission mechanism.

More particularly, each node generates a list of all immediate neighbors on the spanning tree using the current data in its topology data base when a message is received. An acknowledgement for the received multicast message is transmitted to each of these near neighbors and a time-out timer set while awaiting acknowledgments from all of the near neighbors. If an acknowledgment is not received from one or more near neighbors, the broadcast message is retransmitted to those near neighbors, using a "reliable" point-to-point transmission mechanism such as that disclosed by E. J. Weldon, Jr. in "An Improved Selective-Repeat ARQ Strategy," *IEEE Transactions on Communications*, Vol. COM-30, No. 3, pages 480–486, March 1982. With such a mechanism, the delivery of the message is guaranteed at lower protocol levels and thus can be assumed to be completed for the purposes of this invention. When all acknowledgments are received, a time out is initiated after the termination of which the process is terminated at that node. This time out is to make sure that a delayed retransmission from another node is discarded and does not initiate a new multicast cycle.

In accordance with one feature of the present invention, if a node receives an acknowledgment which is undecipherable, a no-acknowledgment (NACK) message can be sent to the neighbor which then immediately retransmits the message using the reliable point-to-point transmission mechanism without waiting for a time out of an ACK timer. If the NACK is lost, the sending node waits until the ACK time out. This procedure increases the speed of reliable transmission to all nodes on the spanning tree when the original message is lost somewhere in the transmission across the spanning tree.

In accordance with yet another feature of the invention, if a node receives a reliable point-to-point multicast message before it receives the original multicast message, that node immediately transmits point-to-point copies of the message to its near neighbors from which an acknowledgment has not yet been received without waiting for an ACK timeout. The speed of reliable transmission to all nodes on the tree in the face of message loss is thereby further enhanced.

The reliable transmission scheme described above has the advantage of allowing each node to release its buffers as soon as acknowledgments are received from all of its near neighbors. These acknowledgments are transmitted from the near neighbors themselves, thus limiting the normal holding time to the transit time on the single connecting link and requiring a timeout time related to this single link transmission time. In the prior art, on the other hand, where the destination nodes transmitted acknowledgments to the source, the buffer holding time was related to the maximum depth of the spanning tree, involving very many inter-node links.

A complete understanding of the present invention may be gained by considering the following detailed description in conjunction with the accompanying drawings, in which:

To facilitate reader understanding, identical reference numerals are used to designate elements common to the figures.

DETAILED DESCRIPTION

Figure 1:
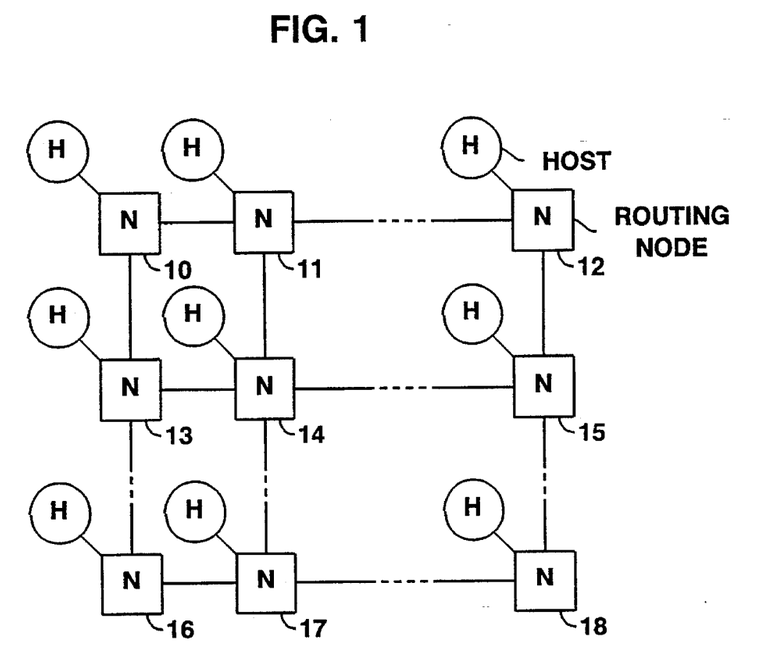
FIG. 1 shows a general block diagram of a packet communications network in which the methods and apparatus of the present invention might find use.
Figure 2:
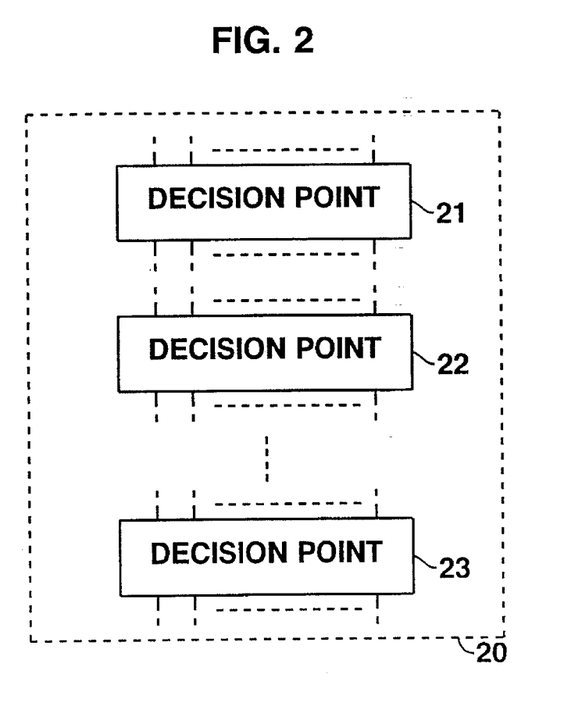
FIG. 2 shows a more detailed block diagram of a typical routing node shown in FIG. 1.

In FIG. 1 there is shown a general block diagram of a packet communications network comprising a plurality of routing nodes 10 through 18 arranged in FIG. 1 in a regular two-dimensional lattice. Nodes 10–18 may, however, be arranged in any connected graph arrangement, each node having a plurality of incoming transmission links and a plurality of outgoing transmission links, the two pluralities normally, but not necessarily, being equal. Each of nodes 10–18 is associated with a host computer which performs all of the storage, routing and control functions necessary to operate the node. Each of nodes 10–18 is capable of routing data packets from any of the incoming transmission links to any of the outgoing transmission links. As is shown in FIG. 2, each of nodes 10–18 may comprise one or more decision points 21, 22, . . . , 23 which, in turn, is disclosed in more detail in FIG. 3. These figures will be described in detail hereinafter.

In packet communications networks such as that shown in FIG. 1, although routes for packets are calculated before launching such packets on the network, the actual communication links are not dedicated to that packet until the receipt of the packet at the switching node. Each link in the route is utilized for transmission in response to routing information in a routing header forming the initial portion of the packet. Incoming data packet headers are examined to determine the appropriate outgoing transmission link or links on which the packet is to be forwarded. In response to the header information, the packet is actually transmitted on the appropriate outgoing link or links.

In FIG. 2 there is shown a typical switching node such as nodes 10–18 of FIG. 1. It will be noted that each of these switching nodes comprises one or more subnode decision points 21–23 each having a plurality of incoming transmission paths and a plurality of outgoing transmission paths. As will be shown more clearly in FIG. 3, the incoming transmission paths to subnode decision points 21–23 may come from remote switching nodes in the packet communications network, from decision points within the same switching node, or from user applications accessing the packet network at that switching node. The availability of more than one decision point allows each node to handle any number of incoming and outgoing transmission links since the number of links can be increased by including additional decision points in the node. A large plurality of local user applications can likewise access each switching node by the use of multiple decision points.

It should be noted that the decision point of FIG. 2 is responsible for switching or forwarding multicast messages without assistance from the host computers H of FIG. 1, once a spanning tree is set up. Because of this autonomy of the decision points, a host computer H may not receive a multicast message when other hosts downstream do receive the message. Similarly, a host never knows if other hosts have received a multicast message without receiving an acknowledgement (ACK) from that host. Finally, a host computer doesn't necessarily receive a multicast message earlier than other host computers further downstream on the spanning tree.

Figure 3:
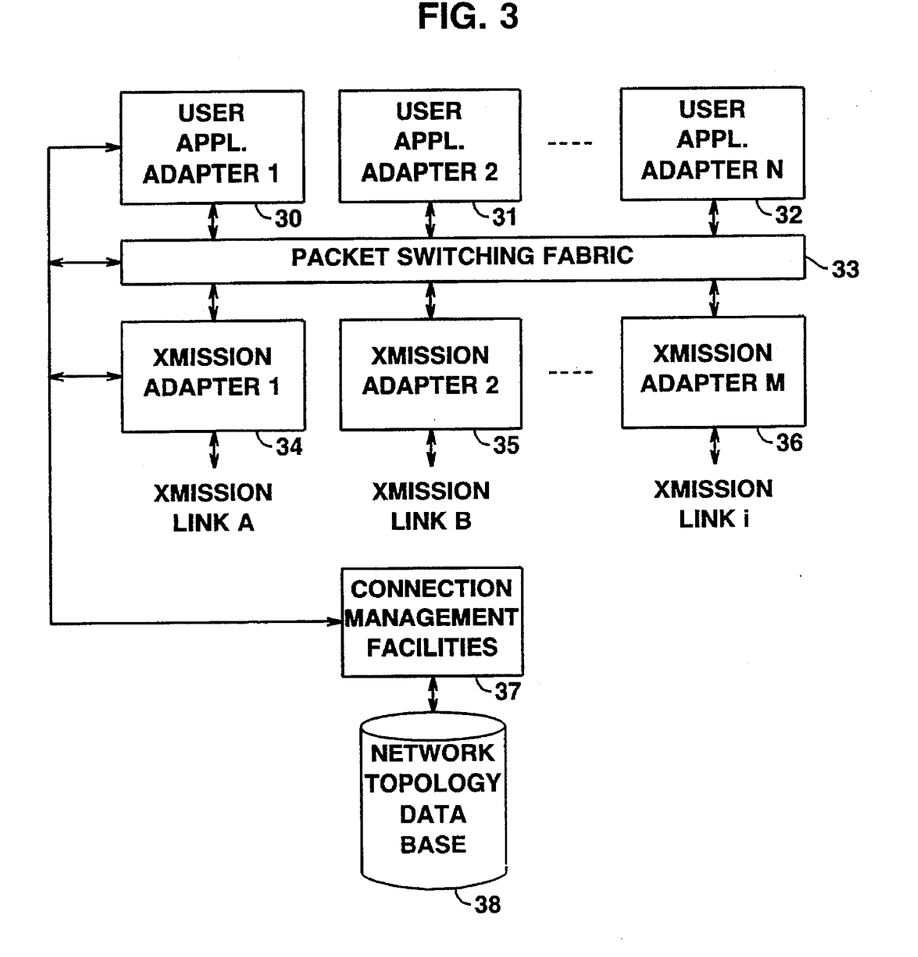
FIG. 3 shows a detailed block diagram of a typical packet decision point shown in FIG. 2.

In FIG. 3 there is shown a typical subnode packet decision point such as decision points 21–23 of FIG. 2. The decision point of FIG. 3 comprises patching switching fabric 33 and a plurality of adapters 30, 31, . . . , 32 and 34, 35, . . . 36. Switching fabric 33 operates to selectively connect any one of adapters 30–32, 34–36 to any other one of these adapters. Switching fabric 33 may, for example, comprise a time divided bus onto which digital signals are written and read in the same time slot by the two adapters connected to each other. Adapters 30–32 and 34–36 are of two kinds, transmission adapters, for connecting to intranode or internode links, and user application adapters for connecting to users of the the packet network. Such user and transmission adapters can be mixed in any proportions in each decision point, depending only on the local requirements. Users are connected to the packet switching system at any node or subnode by means of user application adapters similar to adapters 30–32 of FIG. 3.

The adapters 30–32 and 34–36 and the switching fabric 33 are all controlled by connection management facilities 37, typically software programs in the host computer ("H" in FIG. 1), but which may also be implemented by special purpose circuits. The functions provided by the connection management facilities 37 are supported by a network topology data base 38 which contains and maintains an up-to-date record of all of the resources available in the packet network. These resource records are used in calculating transmission paths between originating and destination user applications and in calculating tree paths for interconnecting a plurality of user applications. The multicast transmission of packets is well known and is disclosed in "Multipoint Connection Management in High Speed Networks," by Bubenik et al., *Proceedings of the IEEE INFOCOM* 1991, April 1991, and "Reliable Multiuser Tree Setup with Local Identifiers," by Segall et al., *IBM Research Report,* December 1990, as well as in the copending application of E. Hervatic et al., Ser. No. 07/900,628, filed Jun. 18, 1992, and assigned to applicants' assignee. Network topology data base 38 contains, among the other data, the identity of all immediate neighbors of the switching node which are on each multicast spanning tree. As will be described hereinafter, a list of such immediate neighbors is constructed whenever a multicast message is received as part of the reliable multicasting scheme of the present invention.

Figure 4:
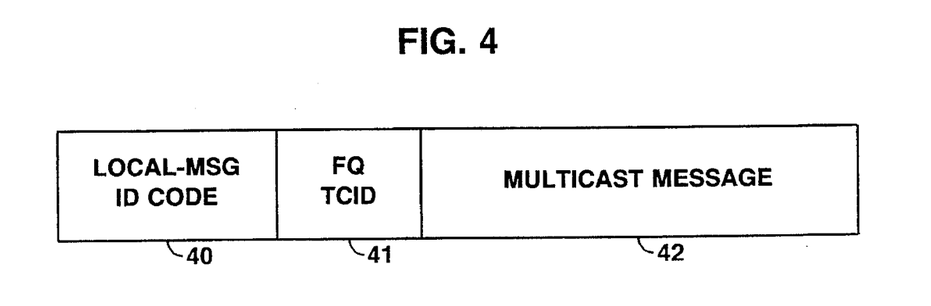
FIG. 4 shows the format of a message which can be used with the reliable point-to-point transmission mechanism of the present invention.

In FIG. 4 there is shown a graphical representation of a so-called reliable message transmitted point-to-point between adjacent nodes in carrying out portions of the present invention. The reliable message of FIG. 4 comprises a header 40 containing a code identifying this particular message as a point-to-point reliable message. In field 41 of FIG. 4 there is contained the identification of the original multicast message itself as a fully qualified transport connection identifier (FQ TCID). In field 42 of FIG. 4 is the multicast message itself. As noted above, reliable messages such as that shown in FIG. 4 may be transmitted by a reliable point-to-point transmission mechanism between pairs of packet switching nodes of the packet communications network of FIG. 1.

Figure 5:
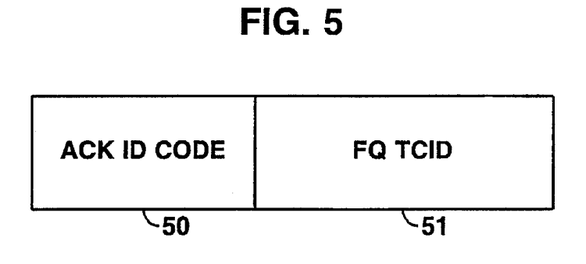
FIG. 5 shows the format of an acknowledgment message which can be used with the reliable multicast transmission mechanism of the present invention.

In FIG. 5 there is shown a graphical representation of a typical acknowledgment message which is transmitted to all near neighbors whenever a multicast message is received at any switching node in the system of FIG. 1. Such acknowledgments are exchanged between each adjacent pair of nodes on a multicast spanning tree as the multicast message is forwarded between the two nodes. The acknowledgment message of FIG. 5 comprises a field 50 containing a unique acknowledgment identification code and a field 51 containing the fully qualified transport connection identifier (FQ TCID) associated with the the original multicast message.

Figure 6:
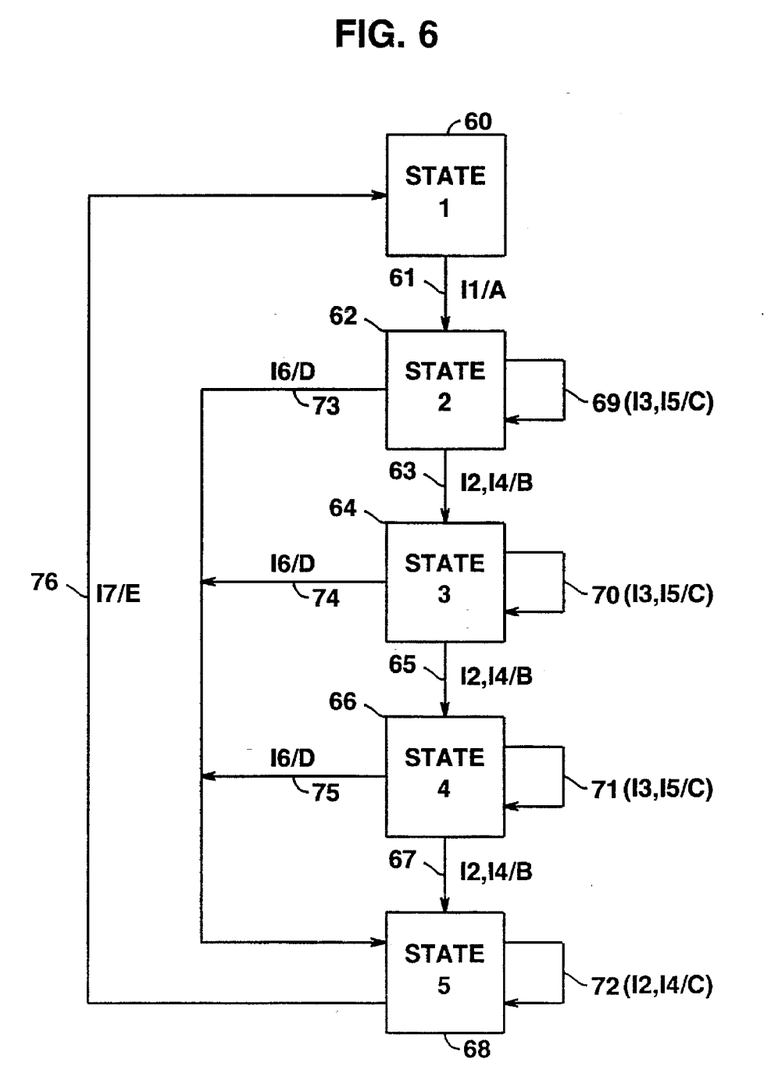
FIG. 6 shows a state transition diagram for the transmission of reliable multicast messages from a source node of the packet communications network of FIG. 1.
Figure 7:
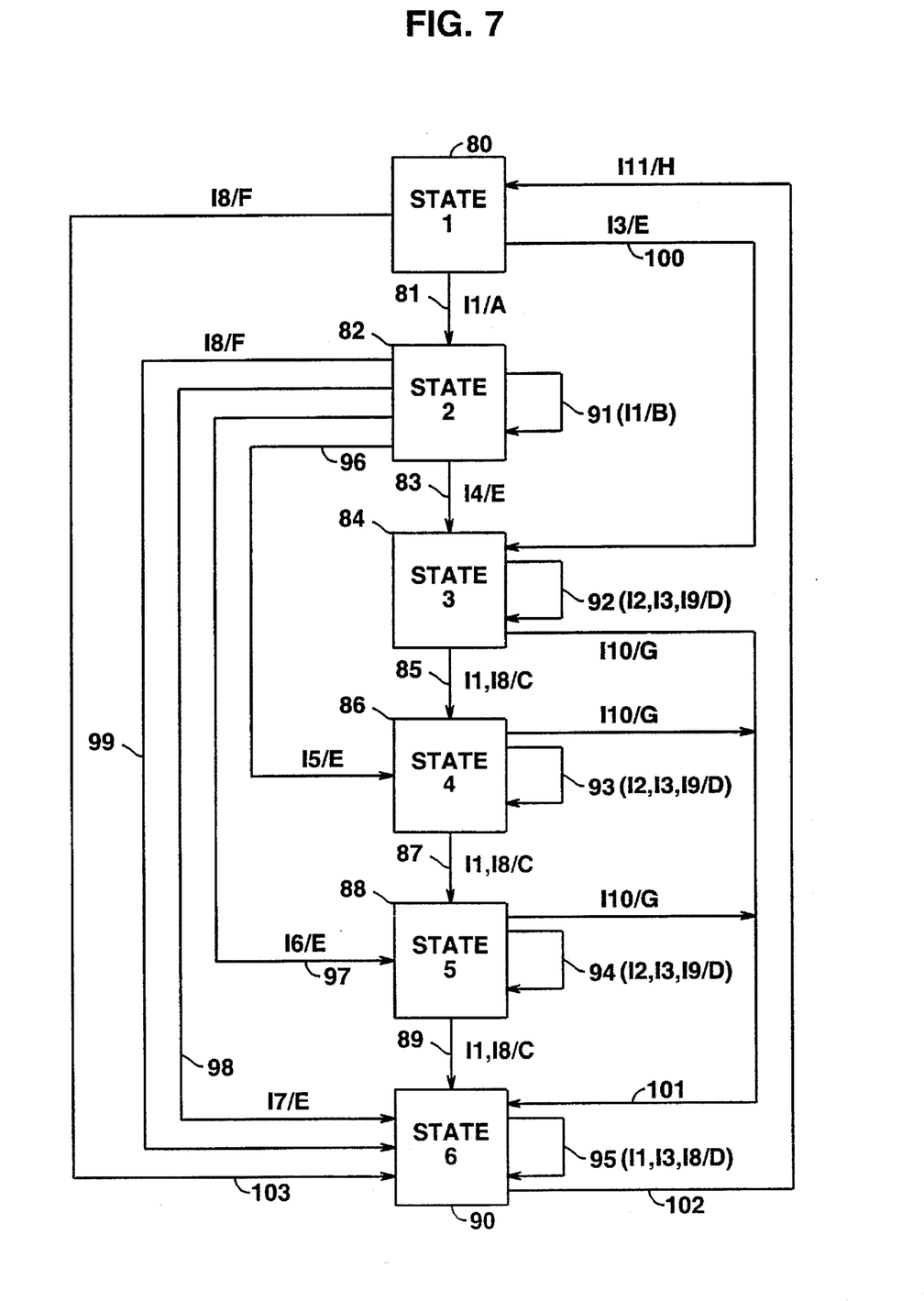
FIG. 7 shows a state transition diagram for the reception of reliable multicast messages in a node of the packet communications network of FIG. 1.

The reliable multicast message delivery system of the present invention will be described in terms of the processes which take place at each node when a multicast message is received at that node and the processes which take place at the source node when a multicast message is transmitted from that node onto the network spanning tree. In the preferred embodiment, these processes are implemented by programming the host computers "H" of FIG. 1. These programmed processes can best be disclosed by means of flow charts indicating the sequence of actions which must take place in response to events occurring at the node. One useful form of such a flow chart is called a finite state machine (FSM) since each event (input) causes the process to move to a new state and to perform specified actions in that state. A complete and accurate description of all of the possible states of the finite state machine, of all of the possible inputs to the finite state machines, and of all of the actions which take place in each state of the finite state machine, is believed to be an adequate and, indeed, the most accurate possible description of the reliable multicasting system of the present invention. FIGS. 6 and 7 are flow charts of the finite state machines for sending and receiving, respectively, a multicast message at any node of the system of FIG. 1. The processes of FIGS. 6 and 7 assume that the node in question has only three immediate neighbors on the spanning tree to simplify the illustration of the present invention. TABLES 1–4 hereinafter provide the same state, input and action data for an indeterminate number of near neighbors on the spanning tree. It is to be noted that a large number of multicasts can be ongoing simultaneously, and hence a number of both sending and receiving finite state machines (FSMs) can exist simultaneously. The FSMs must therefore be identified, most conveniently by the identification of the corresponding multicast message.

Referring then to FIG. 6, there is shown a block flow chart of a finite state machine which can be used to implement the reliable multicast transmission algorithm of the present invention for a node having three immediate neighbors on the spanning tree over which the multicast message is being delivered. The flow chart of FIG. 6 comprises blocks 60, 62, 64, 66 and 68 corresponding to the five distinct states of the finite state machine. Block 60 (State 1) represents the quiescent or idle state in which the finite state machines remain until the node is ready to transmit a multicast message to the three immediately adjacent nodes on the multicast spanning tree. The system will stay in State 1 most of the time since multicast messages are originated only occasionally.

When a host computer generates a message for transmission over the spanning tree (Input I1), the transition represented by arrow 61 takes place, putting the system in State 2. Simultaneously, the Action A is initiated. Action A involves using this new finite state machine to handle this dissemination of a multicast message. The finite state machine is identified with the same fully qualified transport connection identification (FQ TCID) used in FIGS. 4 and 5 to identify the message. At the same time, Action A requires that a list of near neighbors be created. This list, called the "Explicit_list," is generated from the spanning tree information stored in the topology data base 38 of FIG. 3. The Explicit_list is not created earlier because the topology of the packet communications system (FIG. 1) is continuously changing due to the addition of new nodes and new transmission links, and the removal of nodes and links due to failures or obsolescence. Moreover, the membership in the spanning tree is likewise continually changing. It would therefore be inappropriate to generate an Explicit_list prior to the actual transmission of a multicast message. Finally, Action A also starts an acknowledgment time out timer, called "ACK_timer," which measures the longest expected time for the return of acknowledgments (as in FIG. 5) from all of the near neighbors. Note that the ACK_timer time out period is the longest expected round trip time for messages sent between two adjacent nodes, and not multi-link round trip transmission times as in prior art retransmission controls. The system stays in State 2 until the first acknowledgment is received.

When the first acknowledgment is received (Input I2), or if a reliable point-to-point message ("Local_msg") is received (Input I4), and the sending node is on the Explicit_list, block 62 (State 2) is exited via arrow 63 and block 64 (State 3) is entered. It is assumed that the identity of the sender of the Local_msg or an acknowledgement is provided to the host computer H (FIG. 1) by the transport mechanism used for the retransmission of the received message. If an acknowledgment is received, or a Local_msg is received, and the sending node is not on the Explicit_list (Inputs I3 or I5), arrow 69 is followed, retaining the system in block 62 (State 2). The Local_msg input will be discussed hereinafter. Successive acknowledgments or Local_msg's from the second and third immediately adjacent nodes (Inputs I2 and I4) on the spanning tree successively move the system via arrow 65 to block 66 (State 4) and via arrow 67 to block 68 (State 5), providing the sending nodes are on the Explicit_list. If the sending node is not on the Explicit_list, the acknowledgment or the Local_msg is ignored, via arrows 70 and 71, and the system remains in the same state. When the system is advanced from block 62 (State 2) to block 64 (State 3) to block 66 (State 4) to block 68 (State 5) via arrows 63, 65 and 67, respectively, the sending node's identification is removed from the Explicit_list. The Explicit_list becomes empty when block 68 is entered because of the receipt of acknowledgments or Local_msg's. At that time, the ACK_timer is turned off and another timer, called the "Discard_timer," is started. The Discard_timer is set for a period of time after which the FSM can be released. The finite state machine of FIG. 6 can then be returned to the quiescent state (block 60, State 1) via arrow 76. This Discard_timer period of time is of sufficient length to ensure that the old multicast message will not be received again and treated as a new multicast message.

If the ACK_timer times out during State 2, 3 or 4, (Input I6) arrow 73, 74 or 75, respectively, is followed to move directly to State 5 in block 68. That is, if the ACK_timer times out, it is unlikely that the acknowledgments expected but not yet received will ever be received. In that case, Action D is taken. Under Action D, the multicast message is retransmitted (as a Local_msg) to all of the neighboring nodes remaining on the Explicit_list, using the alternative reliable, point-to-point, transmission mechanism. At the same time, the Explicit_list is purged, the ACK_timer is turned off and the Discard_timer is started. That is, once the reliable Local_msg's are transmitted, it is assumed that they will be received, and the finite state machine of FIG. 6 begins to time down.

The finite state machine remains in block 68 (State 5) until the Discard_timer times out (Input I7) at which time it moves, via arrow 76, to quiescent State 1 (block 60). If an acknowledgment is received (Input I2) or a Local_msg is received (Input I4) while in State 5. the system remains in State 5 (Action C) via arrow 72. Once the system returns to block 60 (State 1), nothing more occurs until it becomes necessary to transmit the next multicast message originating at this node.

The states described in connection with FIG. 6 can be summarized as follows:

State 1: Quiescent.

State 2: Multicast Message Transmitted; No ACK's Received.

State 3: Multicast Message Transmitted; 1 ACK Received.

State 4: Multicast Message Transmitted; 2 ACK's Received.

State 5: Multicast Message Transmitted; All 3 ACK's Received or ACK Timeout.

Similarly, the inputs described in connection with FIG. 6 can be summarized as follows:

Input 1: Message to be Multicast.

Input 2: ACK Received, Sender in Explicit_list, or no list.

Input 3: ACK Received, Sender not in Explicit_list.

Input 4: Local_msg Received, Sender in Explicit_list, or no list.

Input 5: Local_msg Received, Sender not in Explicit_list.

Input 6: ACK_timer time out.

Input 7: Discard_timer time out.

The actions described in connection with FIG. 6 are summarized in TABLE 1 below:

TABLE 1

SEND MULTICAST MESSAGE FSM ACTION CODES

| Action Code | Action Description |
| --- | --- |
| A | Identify FSM with the multicast message's TCID. Transmit Multicast Message. Create Explicit_list. Start ACK_timer. |
| B | Take sender of ACK or local_msg off Explicit_list. If Explicit_list becomes empty: Purge Explicit_list. Start Discard_timer. Turn off ACK_timer. |
| C | Ignore Message. |
| D | Send Local_msg to members of Explicit_list. Purge Explicit_list. Start Discard_timer. Turn off ACK_timer. |
| E | Remove FSM identification. |

In FIG. 7 there is shown a flow chart of a finite state machine for implementing the processes necessary to deal with the reception of a multicast message in the reliable multicasting algorithm of the present invention. The flow chart of FIG. 7 includes blocks 80, 82, 84, 86, 88 and 90, corresponding to States 1, 2, 3, 4, 5, and 6 of the finite state machine. Again, the finite state machine illustrated in FIG. 7 assumes that there are only three near neighbor nodes for the node performing the processes of FIG. 7. Fewer or a greater number of near nodes can be implemented by obvious extensions of the flow chart of FIG. 7.

Block 80 (State 1) is the idle or quiescent state while awaiting the reception of a multicast message at the node. When a first acknowledgment is received (Input I1), the finite state machine is created and identified by the fully qualified transport connection identification (FQ TCID) used to identify the multicast message identified in the acknowledgment (FIG. 5). Arrow 81 is then followed to block 82 (State 2) where the reception of the multicast message itself is awaited. At the same time, the identification of the node sending the acknowledgment is stored in a list called the "Receive_list." If an acknowledgment is received while in the quiescent state (State 1), it is assumed that a near neighbor node has received a multicast message and has transmitted the acknowledgment to all of its near neighbors, including this node. This is an abnormal situation since, in the normal situation, an ACK is received after the original multicast message. However, if an ACK is received before the multicast message itself, it is assumed that some failure has occurred, and block 82 (State 2) is entered to await the multicast message itself (or a Local_msg containing the original multicast message). Block 84 (State 3) is entered directly if a multicast message is received before an ACK is received.

If further acknowledgments are received for this multicast message while in State 2, arrow 91 is followed to remain in block 82 (State 2), while the identification of the sending node is added to the Receive_list. If the multicast message is received while in State 2 (block 82) (Input I4–I7), arrow 83, 96, 97 or 98 is followed to block 84 (State 3), 86 (State 4), 88 (State 5) or 90 (State 6), respectively. Action E requires the construction of an Explicit_list. Any sending nodes on the Receive_list are removed from the Explicit_list since acknowledgments have already been received from these nodes. The ACK_timer is started at this time (unless the Explicit_List is empty) to time out the receipt of acknowledgments. If the Explicit_list becomes empty during this operation, all of the neighboring nodes have acknowledged the multicast message and the Explicit_list can be purged and the Discard_timer started.

If a multicast message is received while in State 1 (block 80), then no acknowledgments have been received and there is no Receive_list (Input 3). The finite state machine of FIG. 7 is therefore identified with the TCID at this time and arrow 100 is immediately followed to State 3 (block 84) and Action E, as described above, is undertaken. That is, an Explicit_list is created containing all of the near neighbor identifications of those nodes on the spanning tree, and the ACK_timer is started. The system remains in State 3 (block 84) while awaiting acknowledgments from neighboring nodes. Arrow 85 is traversed if an acknowledgment (Input I1) or a Local_msg (Input I8) is received, and if the sending node is on the Explicit_list. As each new acknowledgment (or Local_msg) is received, the finite state machine advances one state and the sending node is removed from the Explicit_list. In this way, the system moves successively from block 84 (State 3) to block 86 (State 4) to block 88 (State 5) to block 90 (State 6). The Explicit_list becomes empty when block 90 (State 6) is entered. At this time, the ACK_timer is turned off and the Discard_timer started. If acknowledgments or Local_msg's are received from nodes not in the Explicit_list (or after the Explicit_List is purged) in blocks 84, 86, 88 or 90, the state remains the same via arrows 92, 93, 94 or 95, respectively. If an acknowledgment timeout occurs in block 84, 86 or 88 (Input I10), arrow 101 (Action G) is followed and a reliable point-to-point Local_msg copy of the multicast message is sent to all neighboring nodes still on the Explicit_list (acknowledgments not received). The Explicit_list can then be purged and the Discard_timer started. When the Discard_timer times out, arrow 102 is followed to return to the quiescent state (block 80) and the finite state machine is available for use with the next received message.

If, as noted above, while in State 2 (block 82) awaiting the receipt of a multicast message, such a multicast message is received, the Explicit_list is then constructed. If there is no node identification of the Received_list in the Explicit_list, arrow 83 is followed to enter State 3 (block 84) as described above. If, however, there is one node identification of the Receive_list in the Explicit_list at the time the multicast message is received, State 4 (block 86) is entered directly via arrow 96. Similarly, if two or three node identifications of the Receive_list are in the Explicit_list at the time the multicast message is received, State 5 (block 88) or State 6 (block 90) is entered via arrow 97 or arrow 98, respectively. The nodes of the Received_list, if any, are removed from the Explicit_list. If, in this process, the Explicit_list becomes empty, the Discard_timer is started (Action E). If the Explicit_list does not become empty, the ACK_timer is started. Note that the "if" actions described above are fully determined by the current state of the finite state machine (FSM), and are described here only for completeness.

If, while in State 1 (block 80) or State 2 (block 82), a Local_msg is received from a sender, arrow 103 or 99, respectively, is followed directly to State 6 (block 90). That is, if a Local_msg is received while waiting for a multicast message, it is apparent that some fault has occurred to block the multicast message. Under these circumstances, Action F is taken. The finite state machine is identified with the TCID of the message if not previously so identified, an Explicit_list is constructed, and the nodes on the Received_list, if any, removed from the Explicit_list. An acknowledgement is sent to all nodes, except the sender, which are on the Explicit_list and also on the Received_list. A Local_msg is sent to all nodes, except the sender node, which are on the Explicit_list but not on the Received_list. These two lists are then purged and the Discard_time is started.

The states described above in connection with FIG. 7 above can be summarized as follows:

State 1: Quiescent.
State 2: Waiting for Multicast Message.
State 3: Multicast Message Received; No ACK's Received.
State 4: Multicast Message Received; 1 ACK Received.
State 5: Multicast Message Received; 2 ACK's Received.
State 6: Multicast Message Received; All 3 ACK's Received.

Similarly, the inputs described in connection with FIG. 7 can be summarized as follows:

Input 1: ACK Received, Sender in Explicit_list or no Explicit_list.
Input 2: ACK Received, Sender not in Explicit_list.
Input 3: Multicast Message Received, No Received_list.
Input 4: Multicast Message Received, No Received_list in Explicit_list.
Input 5: Multicast Message Received, 1 Received_list in Explicit_list.
Input 6: Multicast Message Received, 2 Received_list in Explicit_list.
Input 7: Multicast Message Received, 3 Received_list in Explicit_list.
Input 8: Local_msg Received, Sender in Explicit_list or no Explicit_list.
Input 9: Local_msg Received, Sender not in Explicit_list.
Input 10: ACK_timer time out.
Input 11: Discard_timer time out.

The actions described in connection with FIG. 7 are summarized in TABLE 2.

TABLE 2

RECEIVE BROADCAST MESSAGE FSM ACTION CODES

| Action Code | Action Description |
| --- | --- |
| A | Identify FSM with multicast message's TCID. Store sender of ACK in Receive_list. |
| B | Store sender of ACK in Received_list. |
| C | Take sender of ACK or Local_msg out of Explicit_list. |

TABLE 2-continued

RECEIVE BROADCAST MESSAGE FSM ACTION CODES

| Action Code | Action Description |
|---|---|
|  | If Explicit_list becomes empty:<br>    Purge Explicit_list.<br>    Start Discard_timer.<br>    Turn off ACK_timer. |
| D | Ignore Message. |
| E | Identify FSM, if not yet identified.<br>Construct Explicit_list.<br>If there is a Received_list:<br>    Take senders of stored ACK's off Explicit_list.<br>If Explicit_list empty:<br>    Purge Explicit_list and start Discard_timer.<br>    Otherwise start ACK_timer. |
| F | Identify FSM, if not yet identified.<br>Construct Explicit_list.<br>Send local_msg to Explicit_list members not in Received_list<br>    (Except sender of the Local_msg).<br>Send ACK to Explicit_list members also in Received_list<br>    (Except sender of the Local_msg).<br>Purge Explicit_list and Received_list.<br>Start Discard_timer. |
| G | Send Local_msg to member of Explicit_list.<br>Purge Explicit_list.<br>Start Discard_timer. |
| H | Remove FSM identification. |

TABLE 3

SEND BROADCAST MESSAGE FSM STATE TRANSITION TABLE

| Inputs: | State Number: 1<br>State Name:<br>FSM Quiescent | i + 2<br>Multicast Sent,<br>i ACK's<br>i = 0 − (N − 1) | N + 2<br>Done<br>Multicast Sent<br>All ACK's |
|---|---|---|---|
| Message to be Multicast | 2/A | / | / |
| ACK (in Explicit_list or no Explicit_list) | / | i + 3/B | −/C |
| ACK (not in Explicit_list) | / | −/C | / |
| Local_msg (in Explicit_list or no Explicit_list) | / | i + 3/B | −/C |
| Local_msg (not In Explicit_list) | / | −/C | / |
| ACK Timeout | / | N + 2/D | / |
| Discard Timeout | / | / | 1/E |

It should be noted that a slash ("/") in a state transition table position means that this event cannot occur. A hyphen ("-") in a state transition table position means that no state transition occurs. It should also be noted that a link failure in the spanning tree is always treated as an ACK transmitted from the node at the other end of the failed link. This allows the node to proceed with a retransmission without waiting for an ACK-timeout.

As noted above, the state transition table for a receive finite state machine with any number of near neighbors is shown in TABLE 4:

TABLE 4

RECEIVE BROADCAST MESSAGE FSM STATE TRANSITION TABLE

| Inputs: | State Number: 1<br>State Name:<br>FSM Quiescent | 2<br>Wait for Multicast | i + 3<br>Multicast Received<br>i ACK's<br>1 = 0 − (N − 1) | N + 3<br>Done Multicast,<br>all ACK's Received |
|---|---|---|---|---|
| ACK in Explicit_list or no Explicit_list | 2/A | 2/B | i + 4/C | −/D |
| ACK not in Explicit_list | / | / | −/D | / |
| Multicast (no Received_list) | 3/E | / | −/D | −/D |
| Multicast, i on Received_list also in Explicit_list, i = 0, . . . , N. | / | i + 3/E | / | / |
| Local_msg (in Explicit_list or no Explicit_list) | N + 3/F | N + 3/F | i + 4/C | −/D |
| Local_msg (not in Explicit_list | / | / | −/D | / |
| ACK Timeout | / | / | N + 3/G | / |
| Discard Timeout | / | / | / | 1/H |

It was assumed in FIGS. 6 and 7 that only three near neighbors existed on the spanning tree. The number of near neighbors can in fact vary from one to any number. If the number of near neighbors is N, then N+2 states are required for the send finite state machine and N+3 states are required for the receive finite state machine. A state transition table for a send finite state machine with any number of near neighbors is shown in TABLE 3 while a state transition table for a receive finite state machine with any number of near neighbors is shown in TABLE 4.

Figure 8:
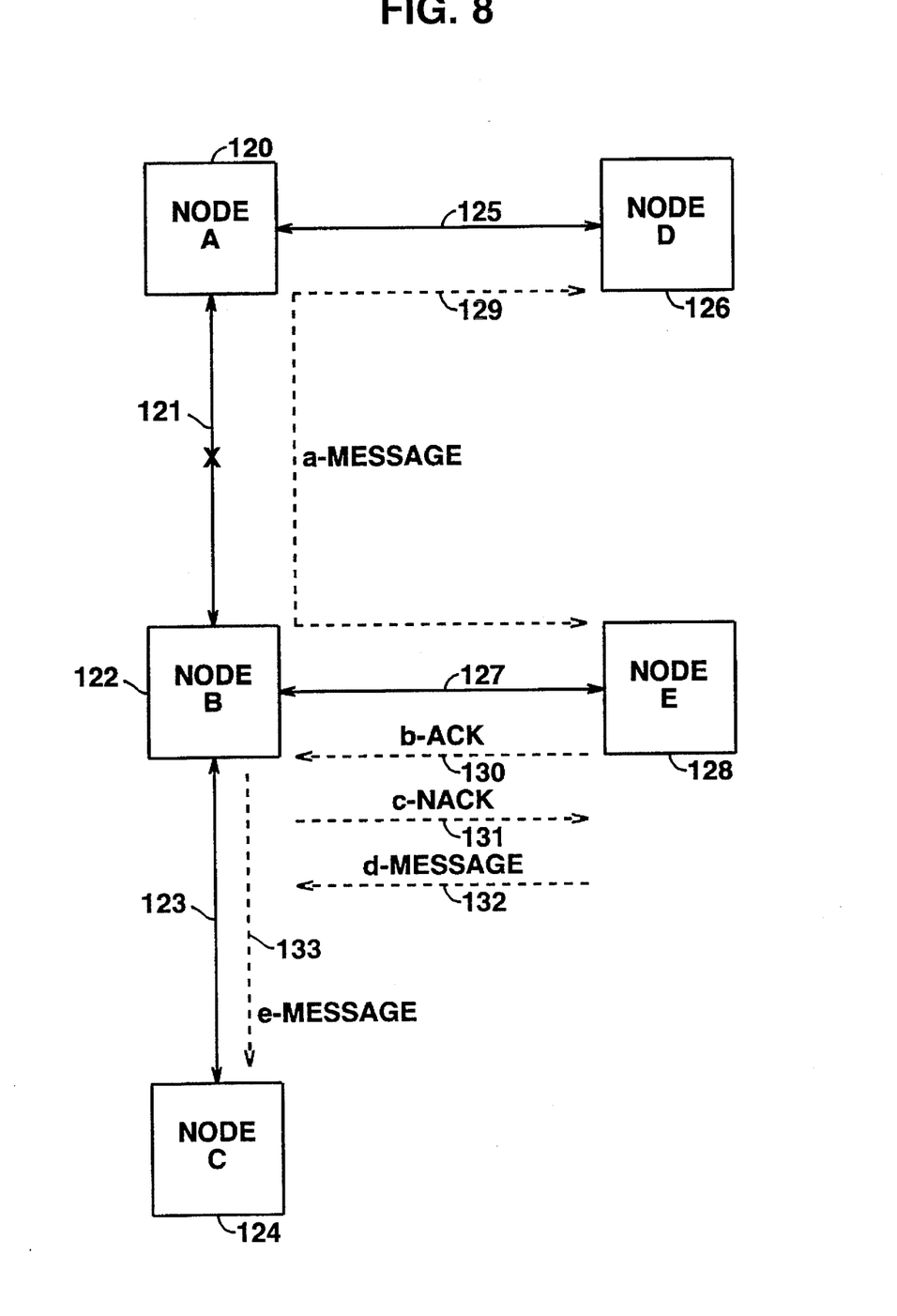
FIG. 8 shows an illustrative example of a spanning tree of packet transmission nodes and transmission links, showing the operation of the system of the present invention in the face of node congestion and link failure.

In FIG. 8 there is shown a graphical representation of an illustrative example of the operation of the reliable multicast transmission system of the present invention. In FIG. 8, the nodes of the system of FIG. 1 are represented by square boxes, the transmission links are represented by solid arrows, and the messages transmitted on the transmission links are represented by dashed arrows parallel to the transmission links on which they are transmitted. The example of FIG. 8 involves only five switching nodes 120, 122, 124, 126 and 128, and the spanning tree connecting these nodes involves only four transmission links: link 121, interconnecting nodes 120 and 122, link 123 interconnecting nodes 122 and 124, link 125 interconnecting nodes 120 and 126, and link 127 interconnecting nodes 122 and 128. It is assumed that Node A (block 120) initially broadcasts a multicast message intended for Nodes B–E (blocks 122, 124, 126 and 128, respectively). This message (represented by dashed line 129 in FIG. 8) reaches Node D (block 126) and passes through Node B (block 122) to Node E (block 128), but is not received by Node B (block 122) nor Node C (block 124) due to a packet loss caused by congestion and buffer overflow inside of Node B (block 122). At this time, the transmission link 121 breaks down to prevent further transmission between Node A (block 120) and Node B (block 122).

The sender Node A (block 120) and each node receiving the message, Node D (block 126) and Node E (block 128), send acknowledgments (ACKs). Thus acknowledgments flow from Node A to Node D, from Node D to Node A, from Node E to Node B (message 130) and from Node A to Node B. The acknowledgment from Node A to Node B is lost, however, due to the failure of transmission link 121. Node D receives acknowledgments from all of its near neighbors (Node A only) and thus is satisfied and times out its discard timer, returning to its quiescent state. Similarly, Node A receives acknowledgments from one of its near neighbors (Node D) and treats the failure in link 121 as the equivalent of an ACK. Node A therefore likewise times out and returns to the quiescent state.

Node E holds a copy of the multicast message because it receives no acknowledgment from Node B. On receiving the acknowledgment from Node E (message 130), Node B realizes that the multicast message was not received. At that point, Node B either lets Node E time out its acknowledgment timer, or immediately sends a "No Acknowledgment" message (NACK, message 131) back to Node E. The NACK message is a particular message for indicating the occurrence of an event which suggests a failure in some portion of the spanning tree, and which can be used to curtail the waiting for a time out to occur before responding the the failure. Thus the reception of an acknowledgement prior to the receipt of the corresponding multicast message, as described above, indicates that some failure has occurred. Rather than having all of the nodes wait for a timeout, the NACK message is transmitted to the node that sent the acknowledgement, allowing this node to retransmit the multicast message without waiting for the ACK timeout. This procedure allows a more rapid response to the failure and hence a faster reliable distribution of the multicast message. Upon receiving the NACK message under these circumstances, the node would then send a reliable point-to-point Local_msg to the sender of the NACK and remove the node from its Explicit_list. The NACK sender, upon receiving the reliable point-to-point Local_msg, then transmits the message to any other neighbors from which no acknowledgement has been received.

In FIG. 8, on receiving the NACK from Node B (or timing out its ACK timer), Node E retransmits the multicast message to Node B (message 132), using the reliable point-to-point alternative transmission facility between Node E and Node B. Node E can then discard its copy of the multicast message. Upon receiving the point-to-point reliably transmitted multicast message from Node E, Node B realizes that the original multicast message was never received at Node B. Since no acknowledgment has been received from Node C, Node B immediately transmits a reliable point-to-point copy of the multicast message to Node C (message 133).

It can be seen that the multicast message is reliable delivered to all nodes on the spanning tree even when the spanning tree is partitioned by a link failure, and that the partitions each continue the multicast distribution after the partioning failure occurs.

What is claimed is:

1. A packet transmission network comprising a plurality of nodes, a plurality of transmission links for interconnecting said nodes to each other, and multicast transmission means for transmitting the same multicast message to a plurality of said nodes, the interconnection between said nodes being represented by a spanning tree, means at each said node for transmitting an acknowledgment of the receipt of said multicast message at said each node interconnected by said spanning tree to all nodes immediately adjacent to said each node on said spanning tree, and means at each said node for retransmitting said multicast message when acknowledgments of the reception of said multicast message are not received from all of said immediately adjacent nodes on said spanning tree.

2. The packet transmission network according to claim 1 further comprising reliable point-to-point transmission means between each adjacent pair of said nodes, said retransmitting means utilizing said reliable point-to-point transmission means.

3. The packet transmission network according to claim 1 further comprising means for generating a list of all near neighbors of .a given node whenever said multicast message is received by or transmitted from said given node.

4. The packet transmission network according to claim 3 further comprising means for removing from said list all of said near neighbors which have already returned acknowledgements to said given node at the time said list is generated.

5. The packet transmission network according to claim 1 further comprising timing means for timing out a predetermined period of time after the transmission of said multicast message for the receipt of acknowledgments from all near neighbors of said node, and means for retransmitting said multicast message, after the timing out of said timing means, to all of said near neighbors from which acknowledgments have not been received.

6. The packet transmission network according to claim 2 further comprising means for retransmitting said multicast message, immediately after the receipt of said multicast message over said reliable point-to-point transmission means, to all of said near neighbors from which acknowledgments have not been received.

7. The packet transmission network according to claim 2 further comprising means responsive to the receipt of an unexpected acknowledgement message for transmitting a non-acknowledgment message to that one of said near neighbors of said each node from which said unexpected acknowledgement message was received.

8. A method for reliably transmitting multicast messages over a packet transmission network, said method comprising interconnecting a plurality of nodes in said network to each other over a plurality of transmission links, and transmitting the same multicast message on a spanning tree in said network, transmitting, from each said node on said spanning tree, an acknowledgment of the receipt of said multicast message at said each node to all nodes immediately adjacent to said each node on said spanning tree, and retransmitting said multicast message from said each node when acknowledgments of the reception of said multicast message are not received from all of said immediately adjacent nodes on said spanning tree.

9. The method according to claim 8 further comprising the steps of interconnecting each adjacent pair of said nodes with reliable point-to-point transmission means, and utilizing said reliable point-to-point transmission means for said step of retransmitting said multicast message.

10. The method according to claim 8 further comprising the step of generating a list of all near neighbors of a given node whenever said multicast message is received by or transmitted from said given node.

11. The method according to claim 8 further comprising the step of removing from said list all of said near neighbors which have already returned acknowledgements to said given node at the time said list is generated.

12. The method according to claim 8 further comprising the steps of timing out a predetermined period of time after the transmission of said multicast message for the receipt of acknowledgments from all near neighbors of said node, and retransmitting said multicast message, after the timing out of said predetermined period, to all of said near neighbors from which acknowledgments have not been received.

13. The method according to claim 10 further comprising the step of retransmitting said multicast message from each node immediately after the receipt of said reliable point-to-point transmission of said multicast message to all of said near neighbors from which acknowledgments have not been received.

14. The method according to claim 8 further comprising transmitting a non-acknowledgment message to a near neighbor of said each node in response to the receipt of an unexpected acknowledgment message from that one of said near neighbors.

15. A reliable multicast message delivery system for a multinode packet transmission network utilizing spanning trees to identify nodes to which multicast messages are to be delivered, said delivery system comprising, means at each said node for receiving and retransmitting multicast messages from and to other members of the same multicast tree, and means at each said node for sending and receiving acknowledgment messages to and from all immediate neighbors of said each node on said spanning tree to which and from which said multicast messages are sent or received.

16. The reliable multicast message delivery system according to claim 15 further comprising reliable point-to-point transmission means between each adjacent pair of said nodes for retransmission of said multicast messages when an acknowledgment is not received.

17. The reliable multicast message delivery system according to claim 15 further comprising means at each said node for creating a list of near neighbors of said each node on said spanning tree only when a multicast message is received at that node, and utilizing said list to insure that said multicast message is retransmitted to all of said near neighbors from which an acknowledgment is not received.

18. In a packet transmission network including a plurality of nodes, a plurality of transmission links for connecting said nodes to each other, and multicast transmission means utilizing a spanning tree for transmitting a multicast message to a plurality of said nodes, improved multicasting means at a selected node capable of receiving and transmitting multicast messages, said improved multicasting means comprising means for transmitting an acknowledgement of a multicast message, received from another node, to all nodes immediately adjacent to the given node on said spanning tree, and means for retransmitting a multicast message when acknowledgements of the reception of the original transmission of the message are not received from all of the immediately adjacent nodes of said spanning tree.

19. The packet transmission network according to claim 18 further comprising reliable point-to-point transmission means between said selected node and each said immediately adjacent one of said nodes, said retransmitting means utilizing said reliable point-to-point transmission means.

20. The packet transmission network according to claim 18 further comprising means for generating a list of all near neighbors of said selected node whenever multicast message is received by or transmitted from said selected node.

21. The packet transmission network according to claim 20 further comprising means for removing from said list all of said near neighbors which have already returned acknowledgements to said given node at the time said list is generated.

22. The packet transmission network according to claim 18 further comprising timing means for timing out a predetermined period of time after the transmission of said multicast message from said selected node for the receipt of acknowledgments from all near neighbors of said selected node, and means in said selected node for retransmitting said multicast message, after the timing out of said timing means, to all of said near neighbors from which acknowledgments have not been received.

23. The packet transmission network according to claim 19 wherein said means for retransmitting comprises means for retransmitting said multicast message, immediately after the receipt of said multicast message over said reliable point-to-point transmission means, to all of said near neighbors from which acknowledgments have not been received.

24. The packet transmission network according to claim 19 further comprising means responsive to the receipt of an unexpected acknowledgement message for transmitting a non-acknowledgment message to that one of said near neighbors of said each node from which said unexpected acknowledgement message was received.

25. For use in a packet transmission network including a plurality of nodes and a plurality of transmission links for interconnecting said nodes, said nodes having a capability of transmitting multicast messages to nodes, the interconnection of which is represented by a spanning tree, an improved multicasting method practiced in a selected node of said network, said method comprising the steps of receiving a multicast message from another node, transmitting the multicast message to all nodes immediately adjacent the selected node on the spanning tree except the node from which the message was received, transmitting an acknowledgement of the multicast message to all nodes immediately adjacent the selected node on the spanning tree, and retransmitting the multicast message when acknowledgements of the receipt of the original transmission of said message are not received at the selected node from all of the immediately adjacent nodes on said spanning tree.

26. The method according to claim 25 further comprising the steps of interconnecting said selected node with each adjacent one of said nodes with reliable point-to-point transmission means, and utilizing said reliable point-to-point transmission means for said step of retransmitting said multicast message.

27. The method according to claim 25 further comprising the step of generating a list of all near neighbors of said selected node whenever said multicast message is received by or transmitted from said selected node.

28. The method according to claim 27 further comprising the step of removing from said list all of said near neighbors which have already returned acknowledgements to said selected node at the time said list is generated.

29. The method according to claim 25 further comprising the steps of timing out a predetermined period of time after the transmission of said multicast message for the receipt of acknowledgments from all said immediately adjacent neighbors of said node, and retransmitting said multicast message, after the timing out of said predetermined period, to all of said near neighbors from which acknowledgments have not been received.

30. The method according to claim 26 further comprising the step of retransmitting said multicast message from said selected node immediately after the receipt of said reliable point-to-point transmission of said multicast message to all of said immediately adjacent neighbors from which acknowledgments have not been received.

31. The method according to claim 25 further comprising transmitting a non-acknowledgment message to an immediately adjacent near neighbor of said selected node in response to the receipt of an unexpected acknowledgment message from that one of said immediately adjacent near neighbor.

* * * * *